(12) United States Patent
Zhang et al.

(10) Patent No.: US 7,673,839 B2
(45) Date of Patent: Mar. 9, 2010

(54) PARALLEL FOUR-BAR MECHANISM

(75) Inventors: Qiang Zhang, Shenzhen (CN); Yundong Qi, Shenzhen (CN)

(73) Assignee: Shenzhen Mindray Bio-Medical Electronics Co., Ltd., Shenzhen (CN)

( * ) Notice: Subject to any disclaimer, the term of this patent is extended or adjusted under 35 U.S.C. 154(b) by 242 days.

(21) Appl. No.: 11/903,327

(22) Filed: Sep. 20, 2007

(65) Prior Publication Data
US 2008/0290235 A1    Nov. 27, 2008

(30) Foreign Application Priority Data
May 24, 2007    (CN)    ......... 2007 1 0074552

(51) Int. Cl.
 A47F 5/00    (2006.01)
 F16M 13/00    (2006.01)
(52) U.S. Cl. ............... 248/281.11; 348/585; 348/284.1
(58) Field of Classification Search ............ 248/281.11, 248/585, 587, 640, 642, 284.1
See application file for complete search history.

(56) References Cited

U.S. PATENT DOCUMENTS

| | | | |
|---|---|---|---|
| 3,436,046 A * | 4/1969 | Valeska | 248/284.1 |
| 4,625,259 A | 11/1986 | Krechmer et al. | |
| 5,743,503 A * | 4/1998 | Voeller et al. | 248/284.1 |
| 5,799,917 A * | 9/1998 | Li | 248/284.1 |
| 6,076,785 A * | 6/2000 | Oddsen, Jr. | 248/118.3 |
| 6,176,456 B1 * | 1/2001 | Wisniewski | 248/281.11 |

FOREIGN PATENT DOCUMENTS

| | | |
|---|---|---|
| CN | 2297994 Y | 11/1998 |
| CN | 2345741 Y | 10/1999 |
| CN | 1587750 | 3/2005 |
| CN | 1751974 | 3/2006 |
| GB | 781756 | 8/1957 |
| JP | 8-14352 | 1/1996 |
| JP | 0814352 | 1/1996 |
| JP | 08014532 A | 1/1996 |
| SU | 1049710 | 10/1983 |
| SU | 1049710 A | 10/1983 |

OTHER PUBLICATIONS

Wang Yong and Yao Xuefeng, Causes of parallel status problem of fourbar linkage and the solution, Jun. 1999.
Wang Yong, Hydraulic support four bar linkage analysis, Jun. 1999.
Chinese Search Report for application CN200710074552.7, filed May 24, 2007.

* cited by examiner

*Primary Examiner*—Anita M King
(74) *Attorney, Agent, or Firm*—Kory D. Christensen; Stoel Rives LLP (57) ABSTRACT

A parallel four-bar mechanism is disclosed, having the second and third bars being parallel to each other and having their opposite ends hinged to the first and fourth bars respectively. A stopping block is provided with a stopping slot, and a movable stopping pin is configured to be engageable with the stopping slot. When an actuating member drives the stopping pin to disengage from the stopping slot, the second and third bars are able to translation relative to each other; and when the actuating member drives the stopping pin into the stopping slot, the second and third bars are locked with each other, with the second and third bars being not able to translation relative to each other, and thus the whole parallel four-bar mechanism is locked in a preset angular position.

14 Claims, 8 Drawing Sheets

PARALLEL FOUR-BAR MECHANISM

TECHNICAL FIELD

The present invention relates to a parallel four-bar mechanism, especially to a parallel four-bar mechanism to be used in medical and diagnostic equipments.

BACKGROUND ART

Parallel four-bar mechanism is a commonly used kinematic mechanism and is widely adopted in medical and diagnostic equipments, such as ultrasonic diagnostic instruments. A parallel four-bar mechanism comprises a first bar, a second bar, a third bar and a fourth bar. The first bar forms a fixed seat, the fourth bar forms a connecting seat to be mounted to a device or an apparatus, and the second and third bars are parallel to each other and are hinged to the first and fourth bars. The parallel four-bar mechanism forms a planar parallelogram, wherein the first to the fourth bars forming four sides of the parallelogram. The parallel four-bar mechanism has a degree-of-freedom for pitching movement and can be used as a supporting arm for a display of an equipment, so as to raising or lowering the display with the posture of the screen of the display remaining unchanged. The parallel four-bar mechanism thus used has a disadvantage. Specifically, no locking means is provided between the second and third bars, and thus translational movement may happen between the second and third bars. In some circumstances, such as for facilitating the handling and transportation of the display, it is difficult to keep the display in a predetermined position without being raised or lowered.

SUMMARY OF INVENTION

An object of the present invention is to overcome the above shortage existed in the prior art by providing a parallel four-bar mechanism having a locking function.

To achieve this object, the present invention provides a parallel four-bar mechanism comprising a first bar, a second bar, a third bar and a fourth bar, the second and third bars being parallel to each other and having their opposite ends hinged to the first and fourth bars respectively, the second bar having a first surface facing towards the third bar, and the third bar having a second surface facing towards the second bar, wherein a stopping block is mounted on the first surface, the stopping block has a stopping slot, a movable stopping pin is mounted on the second surface, the stopping pin and the stopping slot are configured to be engageable with each other, the stopping slot is provided in the movement path of the stopping pin, the stopping pin can be located in a locking position engaged in the stopping slot and an unlocking position disengaged from the stopping slot, thereby the stopping pin is movable between the locking position and the unlocking position, and the stopping pin is driven by an actuating member provided on the third bar.

Preferably, the stopping block has a guiding wall for guiding the stopping pin moving on it, and the stopping slot is formed through the guiding wall.

Preferably, the actuating member comprises a first actuating member for driving the stopping pin in a first direction and a second actuating member for driving the stopping pin in a direction reverse to the first direction.

Preferably, a first track means is provided on the second surface, the stopping pin is movably mounted on the first track means, the first actuating member is an elastic return member disposed between the first track means and the stopping pin, a driving member is disposed between the stopping pin and the second actuating member, the driving member has a first driving end and a second driving end which contact the stopping pin and the second actuating member respectively.

Preferably, a fixing block is mounted on the second surface, the fixing block has a first supporting wall, a second supporting wall and a cavity defined between the first and second supporting walls, the first and second supporting walls have a first supporting hole and a second supporting hole respectively, the first and second supporting holes form the first track means, the middle portion of the stopping pin is disposed in the cavity, and the opposite ends of the stopping pin insert into the first and second supporting holes respectively.

Preferably, the stopping pin comprises a strut, a flange and a pin body integrally formed in this order, the strut and pin body insert into the first and second supporting holes respectively, the elastic return member has two ends abutting against the first supporting wall and the flange respectively, and the first driving end of the driving member is disposed between the flange and the second supporting wall.

Preferably, the second actuating member is a cam, the cam is rotatably mounted on the second surface, the cam surface of the cam has an active section contacting with the second driving end of the driving member and a non-active section not contacting with the second driving end of the driving member, the non-active section comprises a restricting recess, the restricting recess has a high-level holding edge and low-level holding edge corresponding to the positions where a high-level portion and a low-level portion of the active section of the cam act on the second driving end of the driving member respectively, the second surface is provided with an abutting strut, and the abutting strut extends into the restricting recess to abut against the high-level holding edge and the low-level holding edge.

Preferably, the rotation axis of the cam is perpendicular to the first direction, and the cam is fixedly connected with an operating lever.

Preferably, the second actuating member is a pushing block having a slant surface, the pushing block is movably mounted on the second surface, and the oblique surface contacts the second driving end of the driving member.

Preferably, the moving direction of the pushing block is perpendicular to the first direction.

The present invention can thus obtain an advantage over the prior art. Specifically, when the actuating member drives the stopping pin disengaged from the stopping slot, the second and third bars are able to translation relative to each other; and when the actuating member drives the stopping pin into the stopping slot, the second and third bars are locked with each other, with the second and third bars being not able to translation relative to each other, and thus the whole parallel four-bar mechanism is locked in a preset angular position.

BRIEF INTRODUCTION TO THE DRAWINGS

The present invention will be described in details with reference to the drawings in which.

DETAILED DESCRIPTION OF THE PREFERRED EMBODIMENTS

Figure 1:
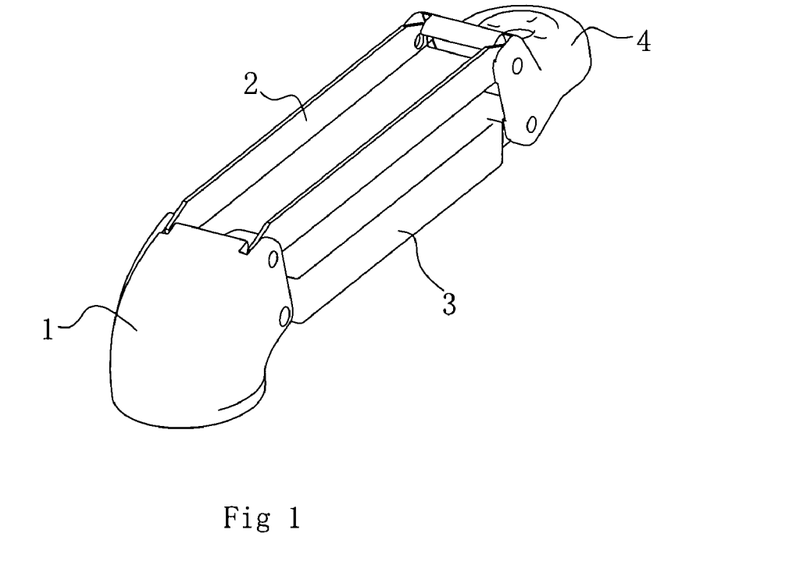
FIG. 1 is a perspective view of a first embodiment of the present invention.
Figure 2:
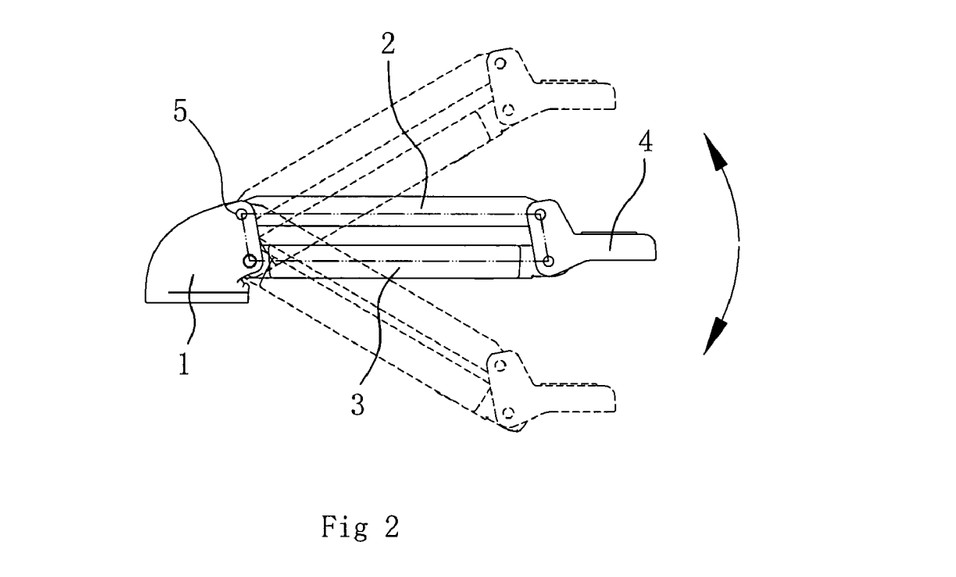
FIG. 2 is a schematic view showing the first embodiment of the present invention when pitching.
Figure 3:
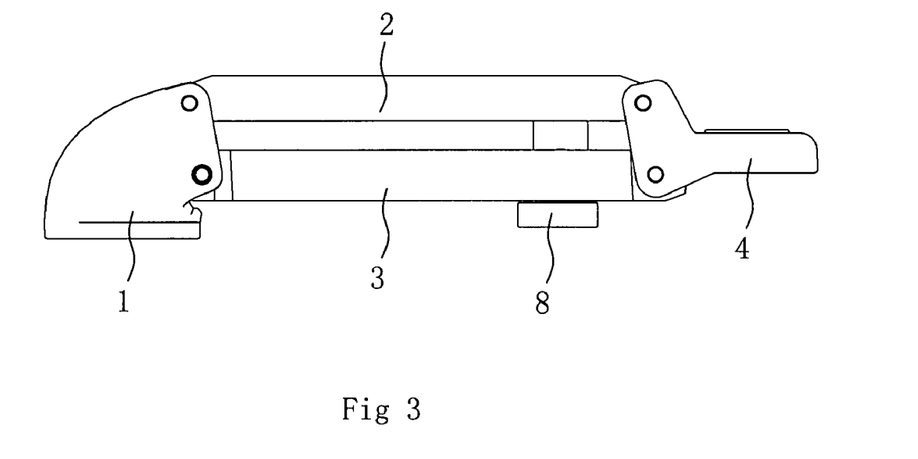
FIG. 3 is a front view of the first embodiment of the present invention.

Referring to FIGS. 1 to 3, a parallel four-bar mechanism of the first embodiment of the present invention comprises a first bar 1, a second bar 2, a third bar 3 and a fourth bar 4. The first bar 1 forms a fixed seat which is adapted to be connected with a basic supporting member. The fourth bar 4 forms a connecting seat having a supporting function so that a device or an instrument, such as a display, can be mounted thereto. The second bar 2 and the third bar 3 are parallel to each other. The opposite ends of the second bar 2 are hinged to the first and fourth bars 1 and 4 via a pivot pin 5 respectively, and the opposite ends of the third bar 3 are hinged to the first and fourth bars 1 and 4 via a pivot pin 5 respectively, thus a parallelogram is defined by the four hinged points. The second bar 2 and the third bar 3 always keep parallel to each other and can pitch (move up and down) around the fixed seat 1 in a certain range of angle, as shown in FIG. 2.

Figure 4:
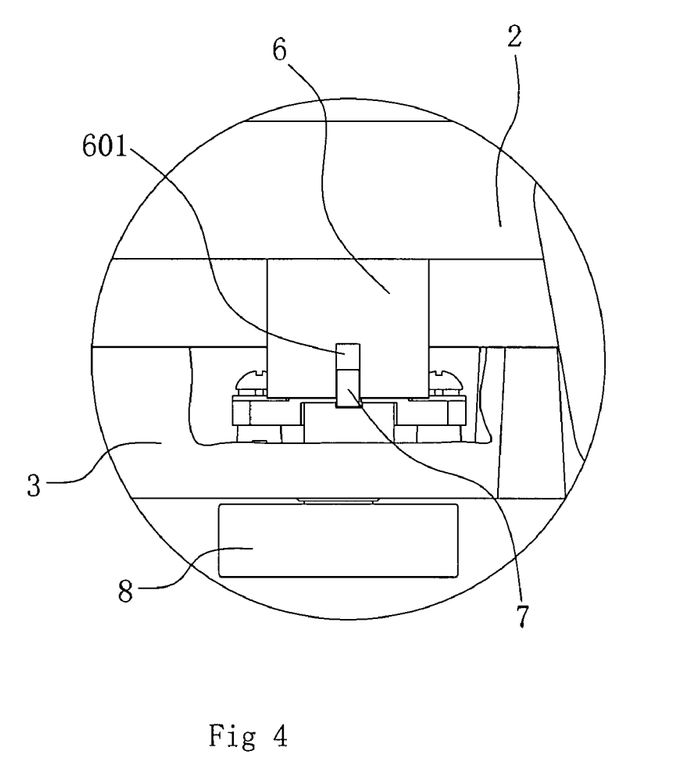
FIG. 4 is a schematic view showing the configuration of a second and a third bars being locked.
Figure 5:
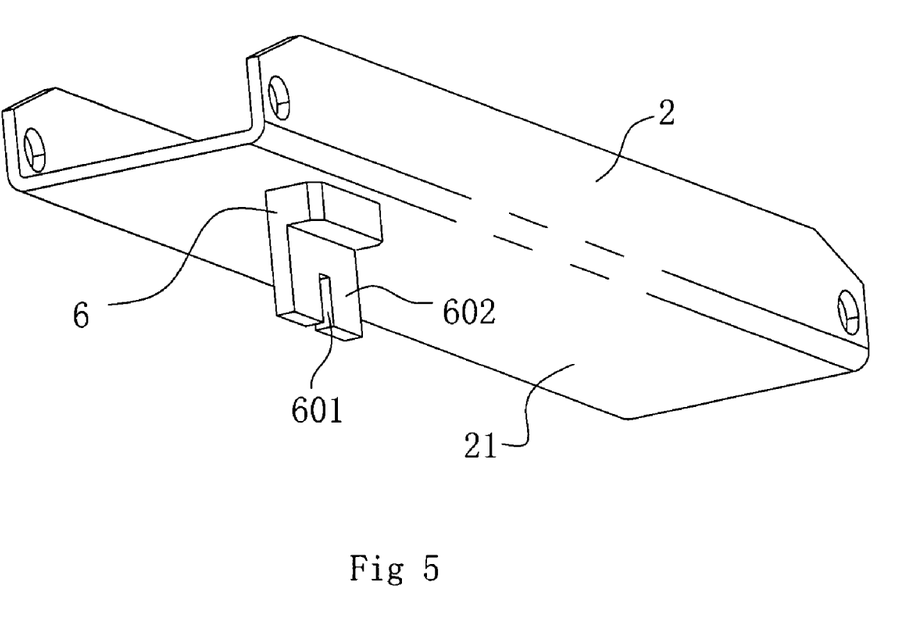
FIG. 5 is a perspective view of a first bar.

With reference to FIGS. 1, 4 and 5, the second bar 2 has a first surface 21 facing towards the third bar 3. A stopping block 6 is mounted on the first surface 21 in an orientation generally perpendicular to the second bar 2. The stopping block 6 has a guiding wall 602 and a stopping slot 601 formed through the guiding-wall 602 substantially at the middle of a protruding end of the stopping block 6.

With reference to FIGS. 4 to 13, the third bar 3 has a second surface 31 facing towards the second bar 2. A stopping pin 7, a fixing block 11 and a driving member 9 are mounted on the second surface 31. The stopping pin 7 extends parallel to the second surface 31 of the third bar 3 and is movable in the lateral direction of the third bar 3. The stopping pin 7 comprises a pin body 701, a flange 702 and a strut 703 integrally formed in this order along a common axis. The pin body 701, formed at the most front end of the whole stopping pin 7, is adapted to be engageable with the stopping slot 601 of the stopping block 6, and the stopping slot 601 is located in the movement path of the pin body 701. The flange 702 is at the middle of the whole stopping pin 7, and the strut 703 is at the rear end of the stopping pin 7 and is formed as a cylindrical body. The fixing block 11 is mounted on the second surface 31 of the third bar 3 by screws. The fixing block 11 has a first supporting wall 1101 and a second supporting wall 1102 which are parallel to each other, and a cavity 1105 defined between the first and second supporting walls 1101 and 1102. The first supporting wall 1101 has a first supporting hole 1103 corresponding to the strut 703 of the stopping pin 7, and the second supporting wall 1102 has a second supporting hole 1104 corresponding to the pin body 701 of the stopping pin 7. The driving member 9 is generally in an "L" shape and has a first driving end 901 and second driving end 902 which are perpendicular to each other. The first driving end 901 is formed with a clamping notch 903.

Figure 6:
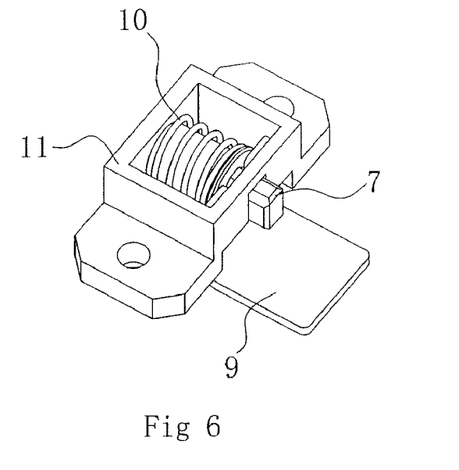
FIG. 6 is a perspective view showing a fixing block, a stopping pin, a spring and a driving member in an assembled state.
Figure 7:
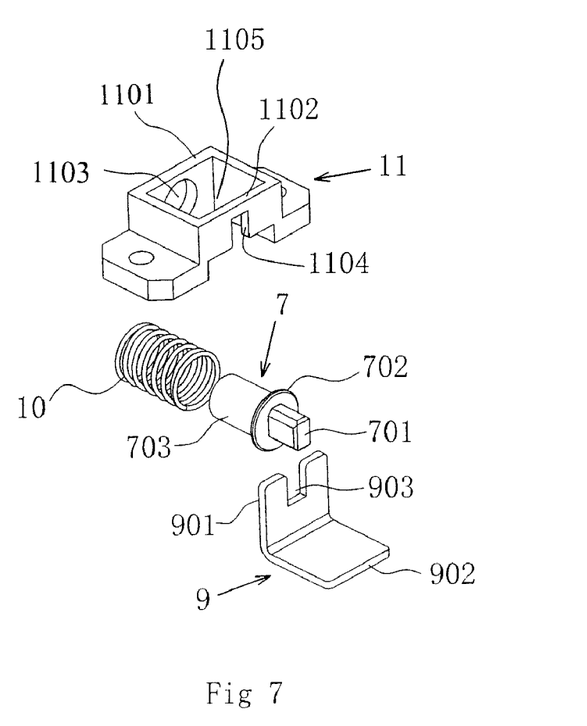
FIG. 7 is an exploded perspective view showing the fixing block, the stopping pin, the spring and the driving member before assembled.

When assembling, first, the strut 703 of the stopping pin 7 is nested into a spring 10 which is then compressed. After that, the stopping pin 7 is inserted into the fixing block 11., with the strut 703 being inserted through the first supporting hole 1103 of the first supporting wall 1101 and the pin body 701 being inserted through the second supporting hole 1104 of the second supporting wall 1102, so that the first supporting hole 1103 and the second supporting hole 1104 support the stopping pin 7 and restrict the movement direction of the stopping pin 7 to the common axis of the first and second supporting holes 1103 and 1104. Then, the first driving end 901 of the driving member 9 is inserted between the second supporting wall 1102 and the flange 702 of the stopping pin 7, such that the pin body 701 is clamped in the clamping notch 903. In a natural condition, the spring 10 is restricted between the first supporting wall 1101 of the fixing block 11 and the flange 702 of the stopping pin 7, with the spring 10 keeping in a compressed state.

Figure 8:
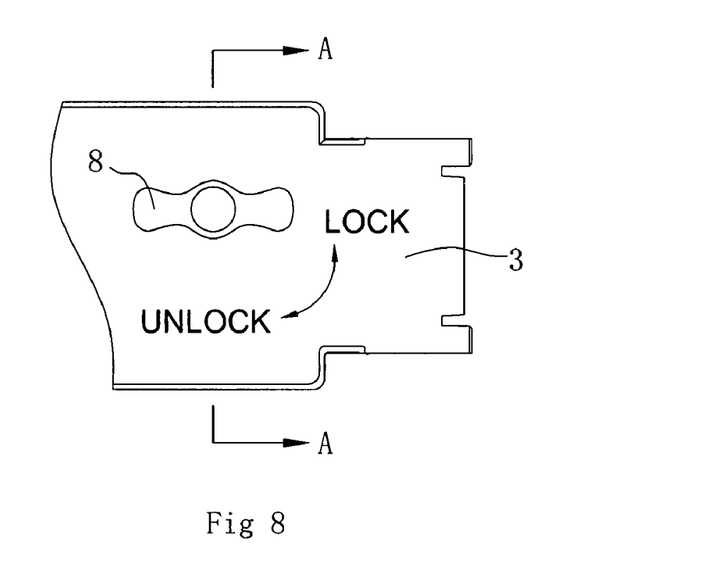
FIG. 8 is a schematic bottom view of the first embodiment with the stopping pin in a locking position.
Figure 9:
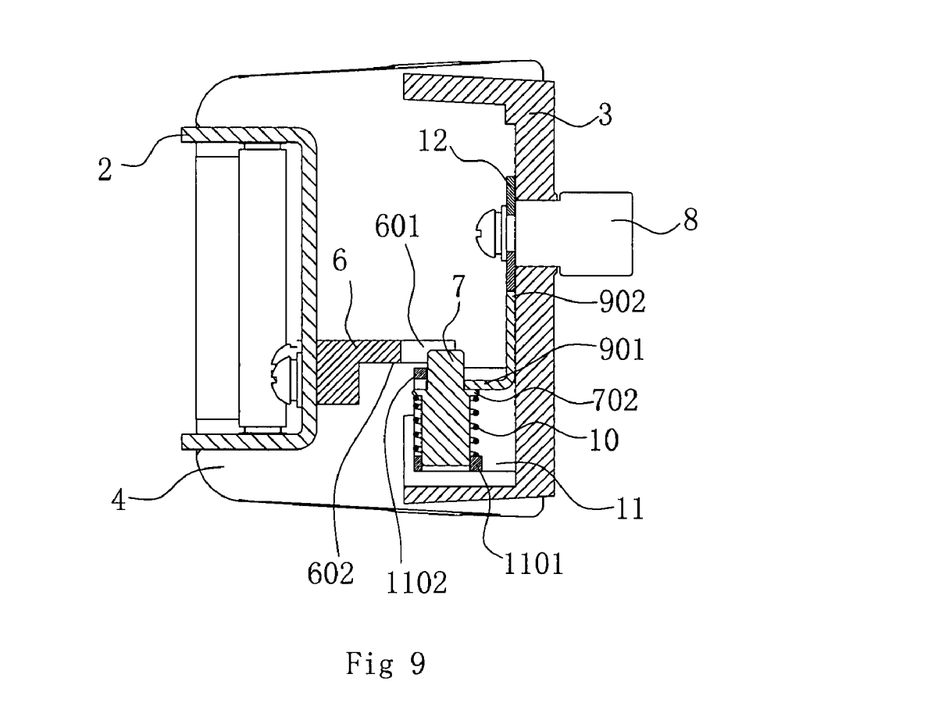
FIG. 9 is a sectional view taken along a line A-A of FIG. 8.
Figure 10:
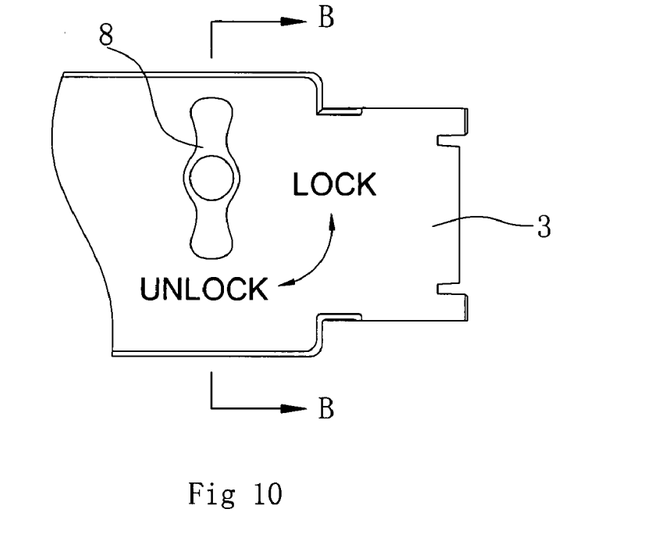
FIG. 10 is a schematic bottom view of the first embodiment with the stopping pin in an unlocking position.
Figure 11:
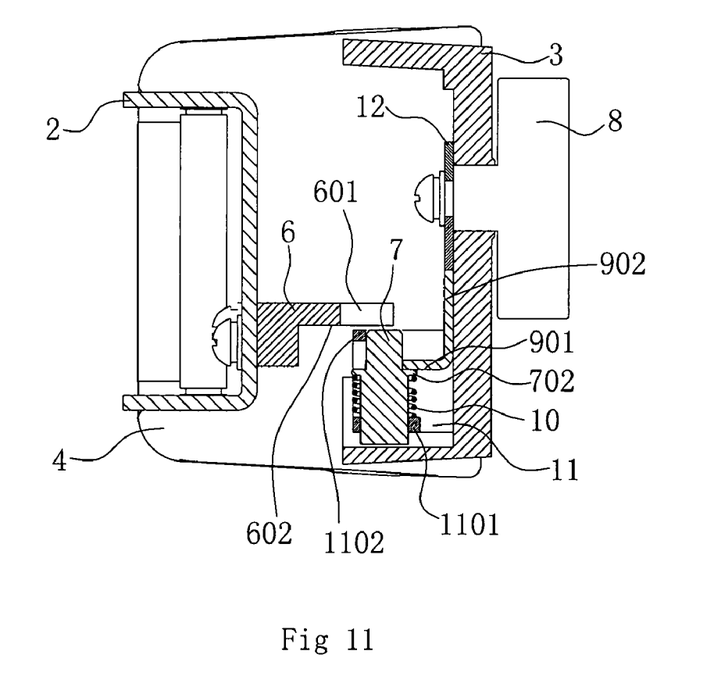
FIG. 11 is a sectional view taken along a line B-B of FIG. 10.
Figure 12:
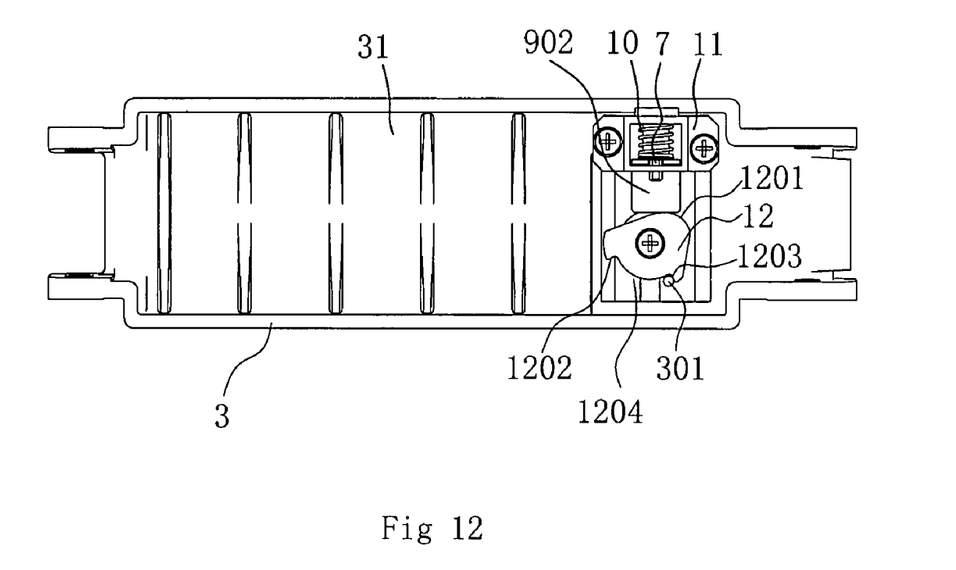
FIG. 12 is a schematic top view of the first embodiment with the stopping pin in the locking position and the second bar having been removed.
Figure 13:
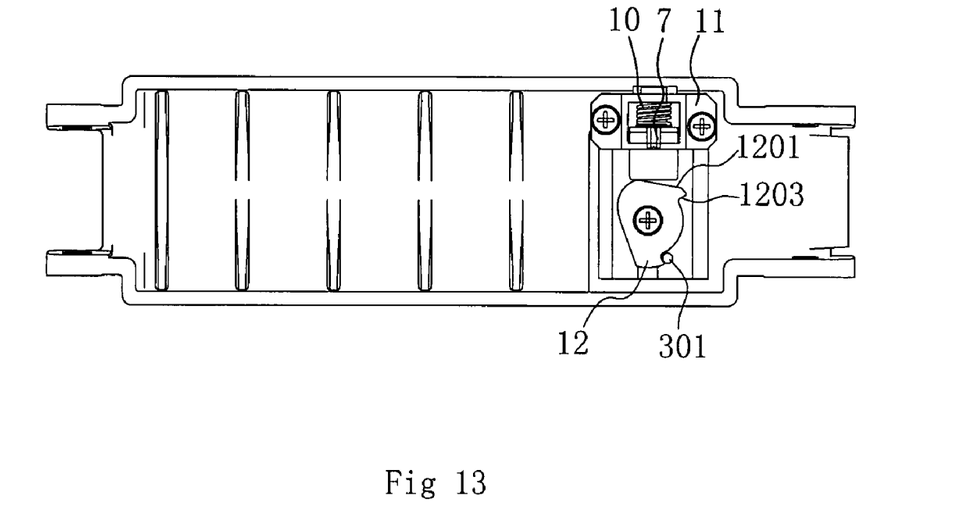
FIG. 13 is a schematic top view of the first embodiment with the stopping pin in the unlocking position and the second bar having been removed.

The driving member 9 is driven by a cam 12, which is rotatably mounted on the second surface 31 of the third bar 3 via a supporting shaft, with the rotation axis of the cam 12 being perpendicular to the axis of the stopping pin 7. The cam surface of the cam 12 has an active section 1201 contacting with the second driving end 902 of the driving member 9 and a non-active section not contacting with the second driving end 902 of the driving member 9. The non-active section comprises a restricting recess 1204 which is delimited at its opposite ends with a high-level holding edge 1202 and a low-level holding edge 1203. The second surface 31 is provided with an abutting strut 301 which extends into the restricting recess 1204. When the abutting strut 301 abuts against the high-level holding edge 1202 or the low-level holding edge 1203, the rotation angle of the cam is determined and hold. The cam 12 is fixedly connected with an outer operating lever 8, thus rotating the operating lever 8 will cause the cam 12 to rotate. The operating lever 8 has a movement path between a locking position "LOCK" and an unlocking position "UNLOCK", as shown in FIGS. 8 and 10. The high-level holding edge 1202 and the low-level holding edge 1203 correspond to the positions where a high-level portion and a low-level portion of the active section 1201 of the cam 12 act on the second driving end 902 of the driving member 9 respectively, wherein the high-level portion is a portion of the active section 1201 which is relatively far away from the rotation axis of the cam 12, and the low-level portion is a portion of the active section 1201 which is relatively near to the rotation axis of the cam 12.

The operation of the parallel four-bar mechanism will now be described. When it needs to lock the mechanism, the operating lever 8 is rotated in an anti-clockwise direction, until the low-level holding edge 1203 of the cam 12 abuts against the abutting strut 301 provided on the third bar 3, with the operating lever 8 now being in the locking position "LOCK", and the cam active section 1201 of the cam 12 contacting the second driving end 902 of the driving member 9 with the low-level portion. The driving member 9 and the stopping pin 7, under the elastic urging force of the spring 10, advance towards the stopping block 6 along the axis of the stopping pin 7, until the end surface of the pin body 701 of the stopping pin 7 reaching the guiding wall 602 of the stopping block 6. In this condition, swinging the parallel four-bar mechanism will cause the pin body 701 of the stopping pin sliding on the guiding wall 602 backwardly or forwardly. When the second and third bars 2 and 3 swing to a horizontal position, which is preferably a predetermined locking position, the pin body 701 of the stopping pin is automatically pushed into the stopping slot 601 of the stopping block by the elastic urging force of the spring 10, until the first driving end 901 of the driving member 9 is pushed against the second supporting wall 11-02 by the flange 702 of the stopping pin 7 under the elastic urging force. In this condition, the pin body 701 of the stopping pin 7 extends through and beyond the stopping block 6 by a certain length, thus the translation movement of the second and third bars 2 and 3 relative to each other is prevented, and the four-bar mechanism is now locked in a predetermined position.

When it needs to unlock the mechanism, the operating lever 8 is rotated in a clockwise direction, which results in the cam 12 pushing the driving member 9 and stopping pin 7 back along the axis of the stopping pin 7, until the high-level holding edge 1202 of the cam 12 abuts against the abutting strut 301, with the operating lever 8 is in an unlocking position "UNLOCK", and the cam active section 1201 of the cam 12 contacting the second driving end 902 of the driving member 9 with the high-level portion. The pin body 701 of the stopping pin 7 now is retracted from the stopping slot 601 of the stopping block 6. In this condition, when the operating lever 8 is released, the helical spring 10, with its elastic urging force, has a tendency of pushing the stopping pin 7 and the driving member 9 backwards, which causes the cam 12 having a tendency of further rotating in the clockwise direction. However, since the high-level holding edge 1202 of the cam 12 abuts now against the abutting strut 301, the cam 12 is stopped from further rotating, and the retraction of stopping pin 7 is also stopped. Thus the stopping pin 7 now is fixed to the present position, and in this condition, the second and third bars 2 and 3 are able to translate relative to each other again. That is to say, the parallel four-bar mechanism is unlocked.

As can be seen from above description, the stopping pin 7 is driven by actuating members, and its movement path comprises a locking position where the stopping pin is engaged in the stopping slot 601 and an unlocking position where the stopping pin is disengaged from the stopping slot 601. The actuating members comprise a first actuating member and a second actuating member, the first actuating member being configured to move the stopping pin 7 from the unlocking position to the locking position, and the second actuating member being configured to move the stopping pin 7 from the locking position to the unlocking position. In the first embodiment, the first actuating member is the return spring 10 provided between the flange 702 of the stopping pin 7 and he first supporting wall 1102 of the fixing block 11, and the second actuating member is the cam 12 which drives the stopping pin 7 when the driving member 9 is operated. The first driving end 901 of the driving member 9 contacts the flange 702 of the stopping pin 7, and the second driving end 902 of the driving member contacts the cam 12. In order to limit the moving direction of the stopping pin 7, the second surface 31 of the third bar 3 is provided with a first track means, which in the first embodiment is formed by the first supporting hole 1103 and the second supporting hole 1104 of the fixing block 11.

When the stopping pin is in one of the unlocking position and the locking position, there is always a gap between the second supporting wall 1102 of the fixing block 11 and the guiding wall 602 of the stopping block 6.

Figure 14:
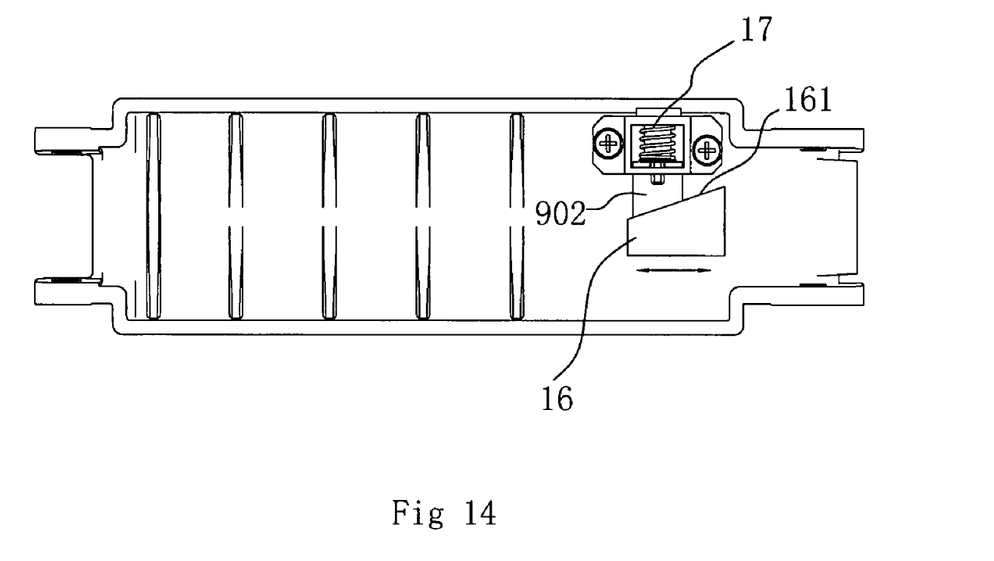
FIG. 14 is a schematic top view of a second embodiment of the present invention with the stopping pin in the locking position and the second bar having been removed.
Figure 15:
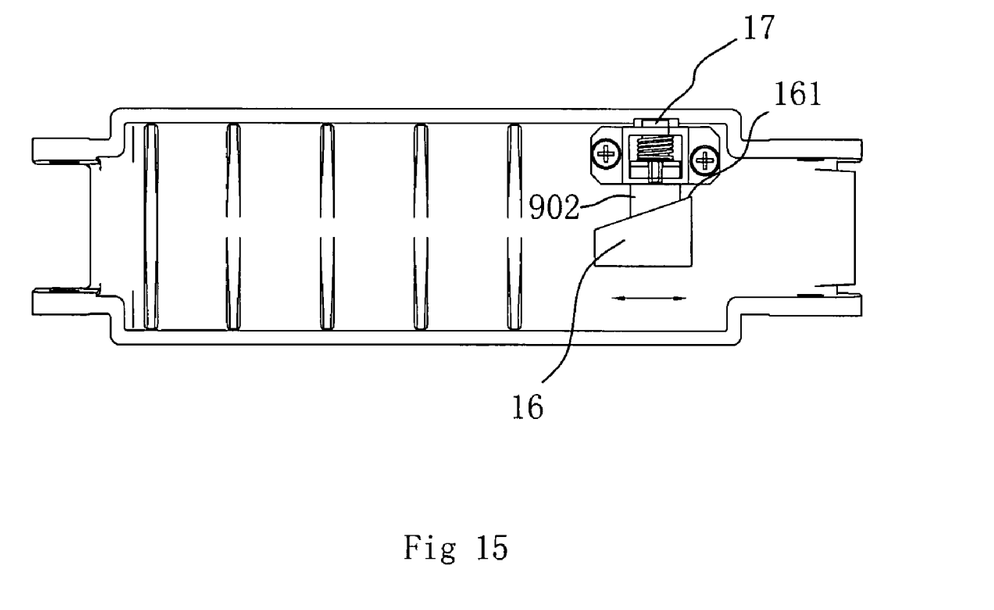
FIG. 15 is a schematic top view of the second embodiment with the stopping pin in the unlocking position and the second bar having been removed.

With reference to FIGS. 14 and 15, which show a second embodiment of the present invention, it can be seen that the second embodiment is different from the first embodiment mainly in that the cam is substituted by a pushing block 16 having a slant surface 161. The pushing block 16 is movably mounted on a second track means for determining its moving direction and is driven by an operating lever. The oblique surface 161 contacts the second driving end 902 of the driving member 9. The operating lever reciprocates the pushing block 16 linearly on the second track means and keeps the pushing block 16 in a stable condition at the opposite ends of the second track means. The direction of the second track means, as shown by an arrow in FIG. 14, is perpendicular to the moving direction of the stopping pin 17. When the operating lever moves forwards or backwards, the driving member 9 is guided by the oblique surface 161 to cause the stopping pin 17 advance or retract, and thus the mechanism is locked or unlocked.

According to the present invention, the second and third bars can be locked in a horizontal position. Alternatively, by changing the positions of the stopping block and the stopping slot, the second and third bars can be locked in any predetermined pitching positions. The linear reciprocating movement of the stopping pin is either effected by the first and second actuating members or effected by a single actuating member.

The present invention is described with reference to its preferred embodiments which are not intended to restrict the scope of the present invention. A skilled in the art will readily recognize that modifications and changes can be made to these embodiments without departing from the spirit of the present invention, and accordingly all these modifications and changes may be regarded as falling within the scope of the present invention.

What is claimed is:

1. A parallel four-bar mechanism comprising a first bar, a second bar, a third bar and a fourth bar, the second and third bars being parallel to each other and having their opposite ends hinged to the first and fourth bars respectively, the second bar having a first surface facing towards the third bar, and the third bar having a second surface facing towards the second bar, wherein a stopping block is mounted on the first surface, the stopping block has a stopping slot, a movable stopping pin is mounted on the second surface, the stopping pin and the stopping slot are configured to be engageable with each other, the stopping slot is provided in the movement path of the stopping pin, the stopping pin can be located in a locking position engaged in the stopping slot and an unlocking position disengaged from the stopping slot, thereby the stopping pin is movable between the locking position and the unlocking position, and the stopping pin is driven by an actuating member provided on the third bar.

2. The parallel four-bar mechanism of claim 1, wherein the stopping block has a guiding wall for guiding the stopping pin moving on it, and the stopping slot is formed through the guiding wall.

3. The parallel four-bar mechanism of claim 2, wherein the actuating member comprises a first actuating member for driving the stopping pin in a first direction and a second actuating member for driving the stopping pin in a direction reverse to the first direction.

4. The parallel four-bar mechanism of claim 3, wherein a first track means is provided on the second surface, the stopping pin is movably mounted on the first track means, the first actuating member is an elastic return member disposed between the first track means and the stopping pin, a driving member is disposed between the stopping pin and the second actuating member, the driving member has a first driving end and a second driving end which contact the stopping pin and the second actuating member respectively.

5. The parallel four-bar mechanism of claim 4, wherein a fixing block is mounted on the second surface, the fixing block has a first supporting wall, a second supporting wall and a cavity defined between the first and second supporting walls, the first and second supporting walls have a first supporting hole and a second supporting hole respectively, the first and second supporting holes form the first track means, the middle portion of the stopping pin is disposed in the cavity, and the opposite ends of the stopping pin insert into the first and second supporting holes respectively.

6. The parallel four-bar mechanism of claim 5, wherein the stopping pin comprises a strut, a flange and a pin body integrally formed in this order, the strut and pin body insert into the first and second supporting holes respectively, the elastic return member has two ends abutting against the first supporting wall and the flange respectively, and the first driving end of the driving member is disposed between the flange and the second supporting wall.

7. The parallel four-bar mechanism of claim 4, wherein the second actuating member is a cam, the cam is rotatably mounted on the second surface, the cam surface of the cam has an active section contacting with the second driving end of the driving member and a non-active section not contacting with the second driving end of the driving member, the non-active section comprises a restricting recess, the restricting recess has a high-level holding edge and low-level holding edge corresponding to the positions where a high-level portion and a low-level portion of the active section of the cam act on the second driving end of the driving member respectively, the second surface is provided with an abutting strut, and the abutting strut extends into the restricting recess to abut against the high-level holding edge and the low-level holding edge.

8. The parallel four-bar mechanism of claim 7, wherein the rotation axis of the cam is perpendicular to the first direction, and the cam is fixedly connected with an operating lever.

9. The parallel four-bar mechanism of claim 4, wherein the second actuating member is a pushing block having a slant surface, the pushing block is movably mounted on the second surface, and the oblique -surface contacts the second driving end of the driving member.

10. The parallel four-bar mechanism of claim 9, wherein the moving direction of the pushing block is perpendicular to the first direction.

11. The parallel four-bar mechanism of claim 5, wherein the second actuating member is a cam, the cam is rotatably mounted on the second surface, the cam surface of the cam has an active section contacting with the second driving end of the driving member and a non-active section not contacting with the second driving end of the driving member, the non-active section comprises a restricting recess, the restricting recess has a high-level holding edge and low-level holding edge corresponding to the positions where a high-level portion and a low-level portion of the active section of the cam act on the second driving end of the driving member respectively, the second surface is provided with an abutting strut, and the abutting strut extends into the restricting recess to abut against the high-level holding edge and the low-level holding edge.

12. The parallel four-bar mechanism of claim 6, wherein the second actuating member is a cam, the cam is rotatably mounted on the second surface, the cam surface of the cam has an active section contacting with the second driving end of the driving member and a non-active section not contacting with the second driving end of the driving member, the non-active section comprises a restricting recess, the restricting recess has a high-level holding edge and low-level holding edge corresponding to the positions where a high-level portion and a low-level portion of the active section of the cam act on the second driving end of the driving member respectively, the second surface is provided with an abutting strut, and the abutting strut extends into the restricting recess to abut against the high-level holding edge and the low-level holding edge.

13. The parallel four-bar mechanism of claim 5, wherein the second actuating member is a pushing block having a slant surface, the pushing block is movably mounted on the second surface, and the oblique surface contacts the second driving end of the driving member.

14. The parallel four-bar mechanism of claim 6, wherein the second actuating member is a pushing block having a slant surface, the pushing block is movably mounted on the second surface, and the oblique surface contacts the second driving end of the driving member.

* * * * *